(12) United States Patent
Imhof et al.

(10) Patent No.: US 9,824,135 B2
(45) Date of Patent: Nov. 21, 2017

(54) METHOD FOR DECOMPOSING COMPLEX OBJECTS INTO SIMPLER COMPONENTS

(71) Applicants: Matthias Imhof, Katy, TX (US); Pavel Dimitrov, Houston, TX (US); Antonio R. C. Paiva, Spring, TX (US)

(72) Inventors: Matthias Imhof, Katy, TX (US); Pavel Dimitrov, Houston, TX (US); Antonio R. C. Paiva, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 772 days.

(21) Appl. No.: 14/272,581

(22) Filed: May 8, 2014

(65) Prior Publication Data

US 2014/0365132 A1 Dec. 11, 2014

Related U.S. Application Data

(60) Provisional application No. 61/832,055, filed on Jun. 6, 2013.

(51) Int. Cl.
*G01V 1/00* (2006.01)
*G06F 17/30* (2006.01)
(Continued)

(52) U.S. Cl.
CPC ........ *G06F 17/30598* (2013.01); *G01V 1/301* (2013.01); *G01V 1/306* (2013.01);
(Continued)

(58) Field of Classification Search
CPC .. G01V 1/301; G01V 1/306; G01V 2210/641; G01V 2210/644;
(Continued)

(56) References Cited

U.S. PATENT DOCUMENTS

| 4,916,615 A | 4/1990 | Chittineni |
|---|---|---|
| 4,992,995 A | 2/1991 | Favret |

(Continued)

FOREIGN PATENT DOCUMENTS

| EP | 2 113 796 | 11/2009 |
|---|---|---|
| WO | WO 99/64896 | 12/1999 |

(Continued)

OTHER PUBLICATIONS

Ho, J. et al. (2003), "Clustering Appearances of Objects Under Varying Illumination Conditions," XP010644876, 2003 IEEE Computer Society Conf. on Computer Vision and Pattern Recognition, pp. 11-18.

(Continued)

*Primary Examiner* — Elias Desta
(74) *Attorney, Agent, or Firm* — ExxonMobil Upstream Research Company, Law Department

(57) ABSTRACT

Method for decomposing a complexly shaped object in a data set, such as a geobody (31) in a seismic data volume, into component objects more representative of the true connectivity state of the system represented by the data set. The geobody is decomposed using a basis set of eigenvectors (33) of a connectivity matrix (32) describing the state of connectivity between voxels in the geobody. Lineal subspaces of the geobody in eigenvector space are associated with likely component objects (34), either by a human interpreter (342) cross plotting (341) two or more eigenvectors, or in an automated manner in which a computer algorithm (344) detects the lineal sub-spaces and the clusters within them.

12 Claims, 8 Drawing Sheets

(51) Int. Cl.
   *G01V 1/30* (2006.01)
   *G06K 9/00* (2006.01)
   *G06K 9/34* (2006.01)

(52) U.S. Cl.
   CPC .......... *G06K 9/00214* (2013.01); *G06K 9/342* (2013.01); *G01V 2210/641* (2013.01); *G01V 2210/644* (2013.01)

(58) Field of Classification Search
   CPC .......... G06F 17/30598; G06K 9/00214; G06K 9/342; E21B 43/00
   See application file for complete search history.

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |
| 5,586,082 A | 12/1996 | Anderson et al. |
| 5,647,058 A * | 7/1997 | Agrawal .......... G06F 17/30017 |
| 5,677,893 A | 10/1997 | de Hoop et al. |
| 5,852,588 A | 12/1998 | de Hoop et al. |
| 5,940,777 A | 8/1999 | Keskes |
| 5,940,778 A | 8/1999 | Marfurt et al. |
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Onyia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,674,689 B2 | 1/2004 | Dunn et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,823,266 B2 | 11/2004 | Czernuszenko et al. |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,024,021 B2 | 4/2006 | Dunn et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,164,990 B2 | 1/2007 | Bratvedt et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurent et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Mueller et al. |
| 7,697,373 B1 | 4/2010 | Padgett |
| 7,881,501 B2 | 2/2011 | Pinnegar et al. |
| 7,925,481 B2 | 4/2011 | Van Wagoner et al. |
| 7,941,442 B2 * | 5/2011 | Li .......... G06F 17/3025 707/780 |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,370,122 B2 | 2/2013 | Walker et al. |
| 8,380,435 B2 | 2/2013 | Kumaran et al. |
| 8,385,603 B2 | 2/2013 | Beucher et al. |
| 8,437,997 B2 | 5/2013 | Meurer et al. |
| 8,447,525 B2 | 5/2013 | Pepper et al. |
| 8,463,551 B2 | 6/2013 | Aarre |
| 8,515,678 B2 | 8/2013 | Pepper et al. |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop et al. |
| 2006/0184488 A1 | 8/2006 | Wentland |
| 2006/0259283 A1 * | 11/2006 | Brughmans .......... G06F 17/5018 703/2 |
| 2007/0067040 A1 | 3/2007 | Ferree |
| 2008/0123469 A1 | 5/2008 | Wibaux et al. |
| 2008/0270033 A1 | 10/2008 | Wiley et al. |
| 2008/0288255 A1 | 11/2008 | Carin et al. |
| 2010/0057418 A1 | 3/2010 | Li et al. |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2010/0274543 A1 | 10/2010 | Walker et al. |
| 2011/0272161 A1 | 11/2011 | Kumaran |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0234554 A1 | 9/2012 | Kumaran |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0138350 A1 | 5/2013 | Thachaparambil et al. |
| 2013/0158877 A1 | 6/2013 | Bakke et al. |

FOREIGN PATENT DOCUMENTS

| | | |
|---|---|---|
| WO | WO 2005/017564 | 2/2005 |
| WO | WO 2009/126951 | 10/2009 |

OTHER PUBLICATIONS

Lomask, J. et al. (2007), "Application of Image Segmentation to tracking 3D Salt Boundaries," *Geophysics* 72(4), pp. P47-P56.
Weiss, Y. (1999), "Segmentation Using Eigenvectors: A Unifying View," 7th IEEE Int'l. Confg. on Kerkyra, pp. 978-982.

(56) References Cited

OTHER PUBLICATIONS

International Search Report and Written Opinion, PCT/US2014/037232, dated Oct. 15, 2014.
Dempster, A.P. et al. (1977), "Maximum Likelihood from Incomplete Data via the *EM* Algorithm," J. of the Royal Statistical Society 39, pp. 1-38.
Fischler M.A. et al. (1981), "Random Sample Consensus: A Paradigm for Model Fitting with Applications to Image Analysis and Authomated Cartography," *Communications of the ACM* 24(6), pp. 381-395.
Hirsch, L.M. et al. (1999), "Graph theory applications to continuity and ranking in geologic models," *Computers & Geosciences* 25, pp. 127-139.
Ho, J. et al. (2003), "Clustering Appearances of Objects Under Varying Illumination Conditions," Proceedngs of the 2003 IEEE Computer Society Conf. on Computer Vision and Pattern Recognition, 8 pgs.
Wang, D. et al. (2009), "K-Subspace Clustering," Proceedings of the European Conf. on Machine Learning and Principals and Practice of Knowledge Discovery in Databases, pp. 506-521.

\* cited by examiner

FIG. 4

| Eigenvector: | 1 | 2 | 3 |
|---|---|---|---|
| Eigenvalue: | 0.000 | 0.037 | 0.177 |
| | -0.213 | -0.281 | -0.140 |
| | -0.213 | -0.294 | -0.184 |
| | -0.213 | -0.303 | -0.216 |
| | -0.213 | -0.257 | -0.071 |
| | -0.213 | -0.288 | -0.164 |
| | -0.213 | -0.301 | -0.208 |
| | -0.213 | -0.194 | 0.103 |
| | -0.213 | -0.123 | 0.259 |
| | -0.213 | 0.225 | -0.136 |
| | -0.213 | 0.231 | -0.154 |
| | -0.213 | 0.235 | -0.169 |
| | -0.213 | -0.048 | 0.370 |
| | -0.213 | -0.009 | 0.392 |
| | -0.213 | 0.212 | -0.094 |
| | -0.213 | 0.223 | -0.130 |
| | -0.213 | 0.231 | -0.154 |
| | -0.213 | -0.009 | 0.392 |
| | -0.213 | 0.029 | 0.345 |
| | -0.213 | 0.106 | 0.190 |
| | -0.213 | 0.1793 | 0.001 |
| | -0.213 | 0.212 | -0.094 |
| | -0.213 | 0.225 | -0.136 |

*FIG. 5*

METHOD FOR DECOMPOSING COMPLEX OBJECTS INTO SIMPLER COMPONENTS

CROSS-REFERENCE TO RELATED APPLICATION

This application claims the benefit of U.S. Provisional Patent Application 61/832,055, filed Jun. 6, 2013, entitled "Method for Decomposing Complex Objects into Simpler Components," the entirety of which is incorporated by reference herein.

FIELD OF THE INVENTION

This disclosure relates generally to the field of geophysical prospecting, and more particularly to the interpretation of seismic data. Specifically, the disclosure describes a method to decompose a complexly-shaped geobody into simpler components.

BACKGROUND OF THE INVENTION

In the oil and gas industry, seismic prospecting techniques commonly are used to aid in the search for and evaluation of subterranean hydrocarbon deposits. A seismic prospecting operation typically proceeds in three separate stages: data acquisition, data processing, and data interpretation. Success of the prospecting operation often depends on satisfactory completion of all three stages.

In the data acquisition stage, a seismic source emits an acoustic impulse known as a seismic signal that propagates into the earth and is at least partially reflected by subsurface seismic reflectors (i.e., interfaces between underground formations having different acoustic impedances). The reflected signals (known as seismic reflections) are detected and recorded by an array of seismic receivers located at or near the surface of the earth, in an overlying body of water, or at known depths in boreholes.

During the data processing stage, raw seismic data recorded in the data acquisition stage are refined and enhanced using a variety of procedures that depend on the nature of the geologic structure being investigated and on characteristics of the raw data. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, to locate potential hydrocarbon reservoirs, to guide the development of an already discovered reservoir, or to help manage hydrocarbon extraction operations.

Often, three-dimensional seismic data are a useful tool for seismic prospecting operations. As used herein, a three-dimensional seismic data volume is a three-dimensional volume of discrete x-y-z or x-y-t data points, where x and y are mutually orthogonal, horizontal directions, z is the vertical direction, and t is two-way vertical seismic signal travel time. In subsurface models, these discrete data points are often represented by a set of contiguous hexahedrons known as samples, cells or voxels, with each voxel representing a volume surrounding a single data point. Each data point, cell, or voxel in a three-dimensional seismic data volume typically has an assigned value (data sample) of a specific seismic data attribute such as seismic amplitude, acoustic impedance, or any other seismic data attribute that can be defined on a point-by-point basis. One column of such a volume is often called a seismic data trace or simply a trace, while a slice through such a volume is often called cross section, or simply section.

A common issue in three-dimensional seismic data interpretation concerns extraction of geologic features from a three-dimensional seismic data volume, evaluation of their geometric relationships to each other, and implications for connectivity. A seismic object, geobody or simply body generally is a region of connected voxels in a three-dimensional seismic data volume in which the value of a certain selected seismic attribute (acoustic impedance, for example) satisfies some arbitrary threshold requirement. For example, the number may be greater than some minimum value and/or less than some maximum value. Bulk processing of a seismic data volume at a certain attribute threshold results in the detection of one or more seismic geobodies. The geobodies may correspond to actual underground reservoirs. Seismic data interpretation time can be reduced significantly via bulk processing a seismic data volume, and generating a collection of geobodies. This processing, of course, is carried out using a suitably programmed computer.

One technique for identifying and extracting geobodies from a three-dimensional seismic data volume is known as seed picking (also known as region growing). Seed picking results in a set of voxels in a three-dimensional seismic data volume that fulfill user-specified attribute criteria and are connected. Seed picking is typically an interactive method, where the user specifies the initial seed voxel and attributes criteria. The seed picking algorithm marks an initial voxel as belonging to the current object, and tries to find neighbors of the initial voxel that satisfy the specified attribute criteria. The new voxels are added to the current object, and the procedure continues until it is not possible to find any new neighbors fulfilling the specified criteria.

Another technique for identifying and extracting geobodies from a three-dimensional seismic data volume is known as thresholding. Thresholding results in multiple sets of voxels in a three-dimensional seismic data volume. Each set of voxels fulfills user-specified attribute criteria and is connected. Thresholding is an automated method, where the user specifies the attribute criteria. The thresholding algorithm examines every voxel with regard to the specified attribute criteria. Acceptable voxel are grouped into contiguous objects based on a user-specified connectivity criterion. Each so isolated object is typically given a unique identifier.

Seed picking and thresholding typically involve assigning a criterion for connectivity. There are three criteria commonly used, although others may be defined and used. One definition is that two cells or voxels are connected (i.e., are neighbors) if they share a common face. By this definition of connectivity, a cell (or voxel) can have up to six neighbors. Another criterion for being a neighbor is sharing either an edge or a face. By this criterion, a cell (or voxel) can have up to eighteen neighbors. The last common criterion for being a neighbor is sharing either an edge, a face, or a corner. By this criterion, a cell (or voxel) can have up to twenty-six neighbors.

As described in U.S. Pat. No. 5,586,082 to Anderson, et al., one exemplary method of seed picking or seed growing involves determining how geobodies that are distinct at one threshold of a chosen attribute may be connected at another threshold. For example, high amplitude regions, suggestive of petroleum presence, may be identified using seismic attribute analysis, with the object of determining oil or gas migration pathways connecting those regions, or alternatively to determine that certain regions are unconnected.

Methods such as disclosed in U.S. Patent Application Publication 2012/0234554 by Kumaran pursue a different strategy to form geobodies. Instead of forming geobodies by inspection of single attribute values, geobodies are formed by way of a texture analysis, i.e., an analysis of the distribution of attribute values within specified neighborhoods. Geobodies are then formed by similarity in texture.

Other methods such as that disclosed in PCT Application Publication WO 2009/126951 employ a seed point and a seed surface surrounding the seed point to create a second surface guided by the seismic attribute and some measure of surface complexity.

Commercial seed detection methods are often solely cell connectivity-based and may lack adequate provisions for analysis of the resulting geobodies. U.S. Pat. No. 6,823,266 to Marek Czernuszenko et al. and U.S. Pat. No. 6,674,689 to Paul Dunn and Marek Czernuszenko describe methods for analyzing the connectivity and three-dimensional characteristics (shape) of geobodies extracted from three-dimensional seismic volumes. These methods allow the geoscientist to collect many geobodies into meaningful assemblages. One notable use of this assemblage of geobodies is in a reservoir characterization and modeling workflow as described in U.S. Pat. No. 7,925,481 to van Wagoner et al.

Since geobody detection and analysis is often a preliminary step in a seismic-based reservoir modeling workflow, considerable effort has been devoted to refining the process. Any inaccuracies in the initial geobody definition can propagate errors in a cascade down through the rest of the workflow.

All seed detection algorithms can produce stratigraphically unreasonable geobodies. The generation of unreasonable geobodies is a result of a fundamental dilemma in volumetric seed detection using attribute thresholds. Narrow (i.e. high) thresholds tend to yield many simple, isolated bodies that may be readily interpreted in terms of the stratigraphic features they represent (e.g. channel fills, delta or deep sea fan lobes), but are difficult to assemble to larger, yet stratigraphically reasonable assemblages. Wide (i.e. low) thresholds, conversely, result in selection of large numbers of voxels that form complex, amorphous geobodies that are not stratigraphically reasonable and are difficult to interpret.

U.S. Pat. No. 7,024,021 to Paul Dunn and Marek Czernuszenko describes a method (called StrataSeed) for including connectivity criteria beyond cell-to-cell contact through the integration of criteria that include larger scale features such as reflections or other layered structures composed of many individual cells. The method reduces the picking of unreasonable bodies and addresses the separation of amorphous, complex geobodies into simpler components through a map view criteria check during geobody detection. A disadvantage of the method of U.S. Pat. No. 7,024,021 is that the boundaries between individual components of larger assemblages or geobodies are determined by the order in which the voxels are selected during bulk processing of the seismic cube.

U.S. Patent Application Publication No. 2010/0274543 to Walker et al. discloses a rule-based method for identifying and extracting connected bodies using wide thresholds of seismic attributes while still yielding stratigraphically reasonable individual. The method works by assigning overlapping portions of the complex geobody to separate components, or by systematically removing voxels according to specified rules until the geobody falls apart into smaller components. The disadvantage of the former method is that the cuts are not necessarily made where expected, while the later method riddles the geobody with holes and creates components with frazzled edges because a great number of voxels may need to be removed before the geobody separates. Moreover, decomposition is only initiated when overlap exists.

What is needed is a method that allows decomposition of any geobody formed from contiguous voxels and obtained by any method into simple, compact components. Preferably, this method can be employed interactively or automatically. The present inventive method satisfies at least these needs.

SUMMARY OF THE INVENTION

In one embodiment, the invention is a method for grouping of data in a set of data points based on similarity or connectivity of what the data represent, comprising: (a) selecting an initial set of data points; (b) defining a measure of similarity or connection, and constructing a similarity or connectivity matrix showing which data points are similar or connected according to the measure; (c) computing eigenvectors of the similarity or connectivity matrix, using a computer; and (d) associating lineal sub-spaces in an eigenvector space with groupings of the data points in the initial set of data points.

In another embodiment, the invention is a method for decomposing a geobody in a seismic data volume into components, comprising: (a) transforming the geobody to a vector space based on connectivity, using a computer; and (b) identifying one or more lineal subspaces in the vector space, and associating the one or more lineal subspaces with components of the geobody.

BRIEF DESCRIPTION OF THE DRAWINGS

The present invention and its advantages will be better understood by referring to the following detailed description and the attached drawings in which:

FIG. 4 is a connectivity matrix for the example bodies of FIGS. 1 and 2;

FIG. 5 shows the first three eigenvalues and the corresponding eigenvectors for the connectivity matrix of FIG. 4;

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF SELECTED EMBODIMENTS

A main objective of the present inventive method is to decompose a geobody into smaller and simpler components. For the purpose of this disclosure, it is completely irrelevant how the geobody is created in the first place. In this disclosure, the inventive method is taught using examples in which geobodies are created from seismic attributes. It is, however, also irrelevant whether the geobody is created based on seismic attributes or some other geophysical, geological, or engineering dataset.

It is even irrelevant whether the geobody is actually a geobody or any other kind of object. Ultimately, what will matter is the existence of a set of entities that are deemed connected. Every element of this set is connected to at least one other element of the same set. Any two elements of this set are connected, which is to say that at least one path can be formed between any two elements that allows traversing from the first element to the second element by following connections between elements of said set.

Figures 1, 2:
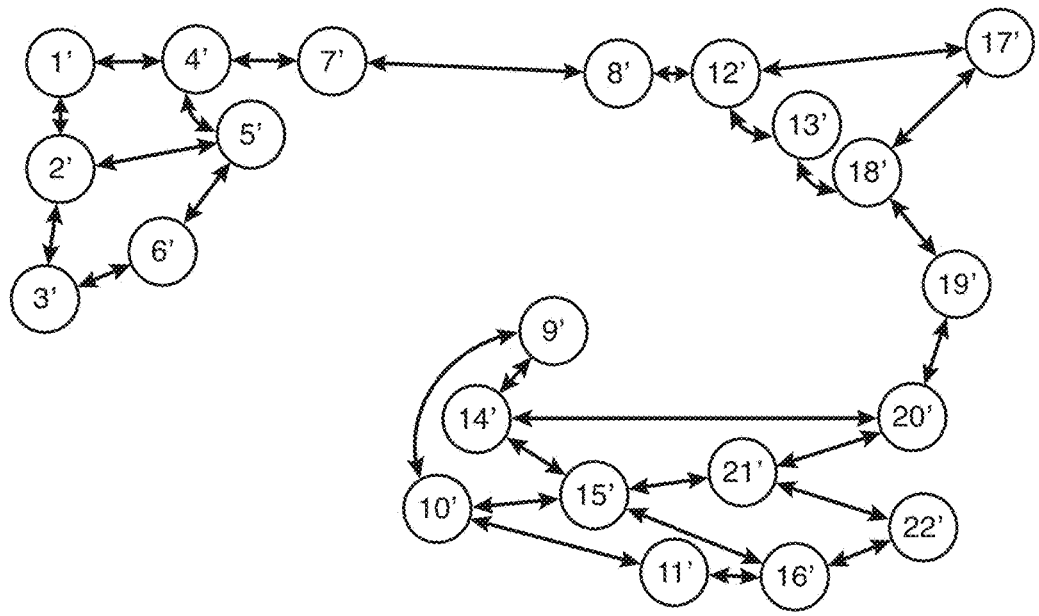
FIG. 1 shows an example of a data set geobody with a complex shape suggesting that the geobody could be beneficially decomposed into components.
FIG. 2 is a diagram of an object that is isomorphic to the geobody of FIG. 1.

FIG. 1 shows a geobody that is to be decomposed into smaller pieces. Voxels that are members of this geobody are enumerated 1 to 22. Voxels that do not belong to this particular geobody are not labeled. The unlabeled voxels could belong to another, not shown geobody or they could belong to some default body or background. Visually, voxels 1, 2, 3, 4, 5, and 6 appear to form one component of the larger geobody. Voxels 7 and 8 appear to bridge this first component to a second component formed by 12, 13, 17, and 18. This second component is linked to a third component by 19. The remaining third component is formed by 9, 10, 11, 14, 15, 16, 20, 21, and 22. Details of the numbering or labeling scheme are irrelevant as long as every voxel has a unique identifier, number, or label. The geobody of FIG. 1 was defined with respect to a four-connectivity definition, i.e., any voxel has at most four connected neighbors where all connections are straight.

FIG. 2 presents another object that consists of 22 elements labeled 1' to 22'. Using some unspecified process, some elements, e.g., 1' and 2', are deemed connected which is indicated by the double-headed arrows. The maximum number of connections any element has in this example is four. Elements 1', 2', 3', 4', 5', and 6' appear to form one component of the larger object. Elements 7' and 8' appear to bridge this first component to a second component formed by 12', 13', 17', and 18'. This second component is linked to a third component by 19'. The remaining third component is formed by 9', 10', 11', 14', 15', 16', 20', 21', and 22'.

For the purpose of the present inventive method, both the geobody of FIG. 1 and the object of FIG. 2 are isomorphous. An aspect of that is that there is an equivalence between voxel 1 and element 1, voxel 2 and element 2, and so on. The objective of the inventive method is the decomposition of a complex object or geobody into the smaller components. The method will be taught using the two-dimensional example of FIG. 1, but some embodiments of the inventive method will perform decomposition of a three- or even higher-dimensional object. The method will be taught using four-connected objects, but some embodiments of the inventive method will perform decomposition of higher connected objects. Some embodiments will decompose relatively regularly connected objects, while other will decompose objects with highly irregular connectivity structures. In some embodiments, all connections are considered equal; while in other embodiments, connections are associated with weights, costs, or qualities that prefer some connections over others.

In essence, the described method is based on a change of the underlying basis function for the geobody and all its decompositions. A geobody is a specified set of voxels. A component of the geobody is a selection of voxels from the specified set. A first set of basis functions to describe all components that can be formed from this set is a set of vectors $(1, 0, 0 \ldots ), (0, 1, 0 \ldots ), (0, 0, 1, \ldots ), \ldots$, each sized to the number of voxels contained in the geobody. Using this first set of basis functions, each voxel is seen as being independent from all others without any indication of proximity or connectivity. What is needed is a set of basis functions that captures groups of voxels. Such a basis can be found by selection of an appropriate operator, applying the operator in light of the connectivity, and computing the eigenvectors and eigenvalues of the resulting matrix. Each eigenvector describes a component. The eigenvectors form a second set of basis functions that describe all components in light of the connectivity between the voxels. The problem with these basis functions is, however, that each voxel belongs to many different components in some fractional manner. The proposed solution is comparison of different eigenvectors and assignment of correlated portions of these eigenvectors to individual components.

Figure 3:
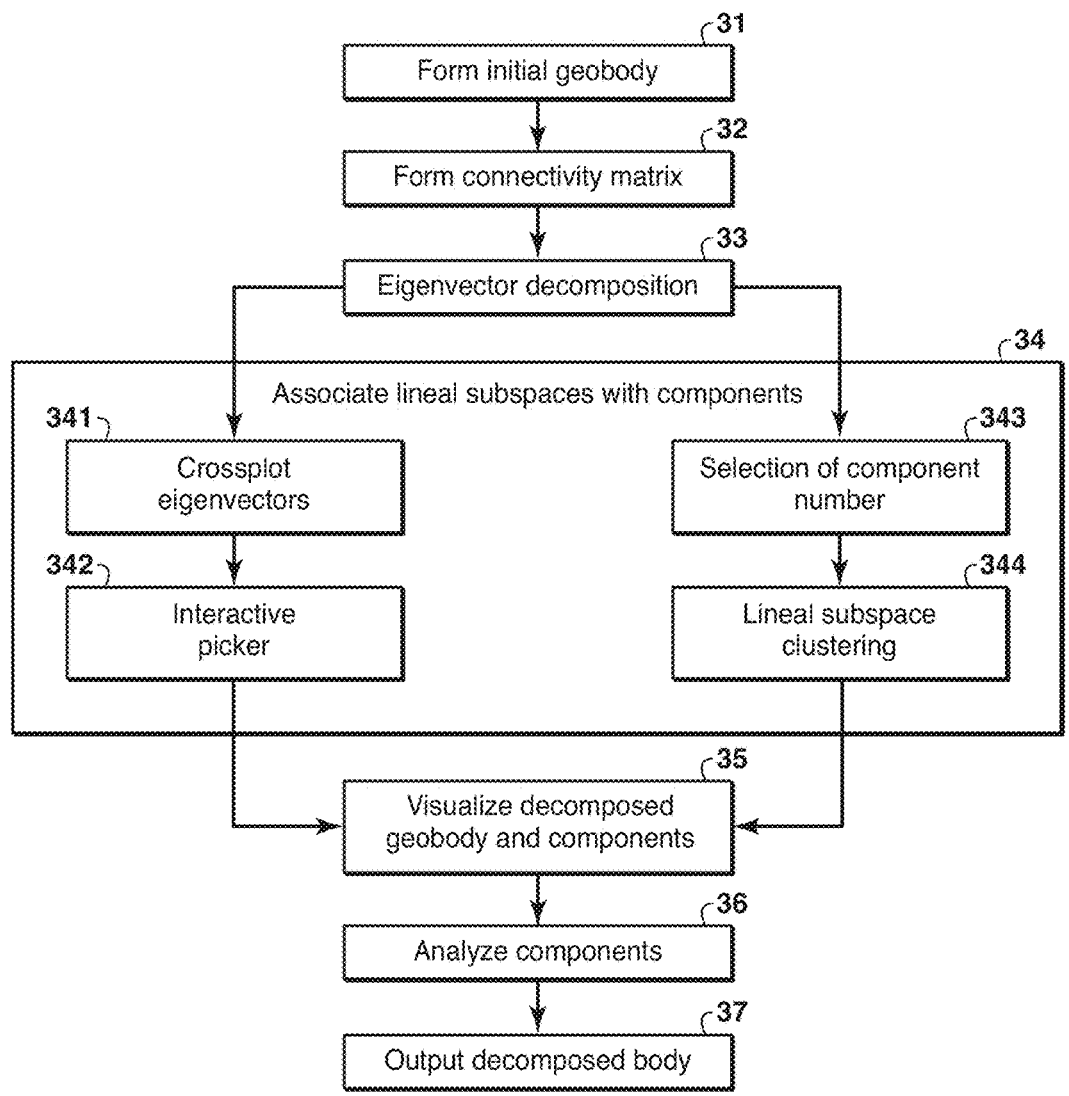
FIG. 3 is a flow chart of basic steps in certain embodiments of the present inventive method.

FIG. 3 is a flowchart showing basic steps in one embodiment of the present inventive method. At step 31, an initial geobody is created. In step 32, the connectivity structure of the geobody is determined, and the connectivity matrix is formed. In step 33, the eigenvectors and eigenvalues of the connectivity matrix are computed. Step 34 associates lineal subspaces in a vector space formed from at least two selected eigenvectors with components of the initial geobody. FIG. 3 shows that there are two preferred embodiments of this step. In one preferred embodiment, this step is performed in an interactive manner. The selected eigenvectors are cross plotted at step 341. Then, an interpreter selects lineal segments from the cross plots and associates these segments with individual geobody components in step 342. In another preferred embodiment, step 34 is performed in an automated manner. First, the number of desired components is specified (step 343). Second, a lineal subspace clustering algorithm is applied to a multidimensional vector formed from the specified eigenvectors. (Specifying the number of desired components is a required input parameter to most lineal subspace clustering algorithms.) Each lineal cluster is associated with an individual geobody component (step 344). In optional step 36, the components may be analyzed, after visualization in step 35. For example, the components may be required to be contiguous. Disconnected portions of a component may be separated into individual components. In a final step, the components of the initial geobody may be outputted for further analysis (step 37). Optionally, the connectivity structure of the components is also outputted. Next, the steps will be discussed in more detail.

Step 31 is formation of an initial geobody. For the purpose of the inventive method, it is irrelevant how this geobody is formed. The only aspect relevant to this step is that a geobody (object) is found that consists of connected voxels (elements). Between any two of its voxels, there exists at least one uninterrupted path along connected voxels. If no path exists between any two voxels, then the geobody is disconnected and really constitutes multiple isolated geobodies. Algorithms for analyzing whether a geobody is fully connected or really consists of multiple isolated geobodies are well known to practitioners of the art. Algorithms for assigning disconnected groups of voxels to separate geobodies are also well known to practitioners of the art. Should the initial geobody consist of multiple disconnected groups of voxels, then the inventive method is simply applied to each group separately.

In some embodiments of the inventive method, the existence of multiple isolated geobodies within the initial geobody is detected in step 33, and the isolation and decomposition of each isolated geobody may be performed simultaneously in the next step (step 34).

Figure 4:
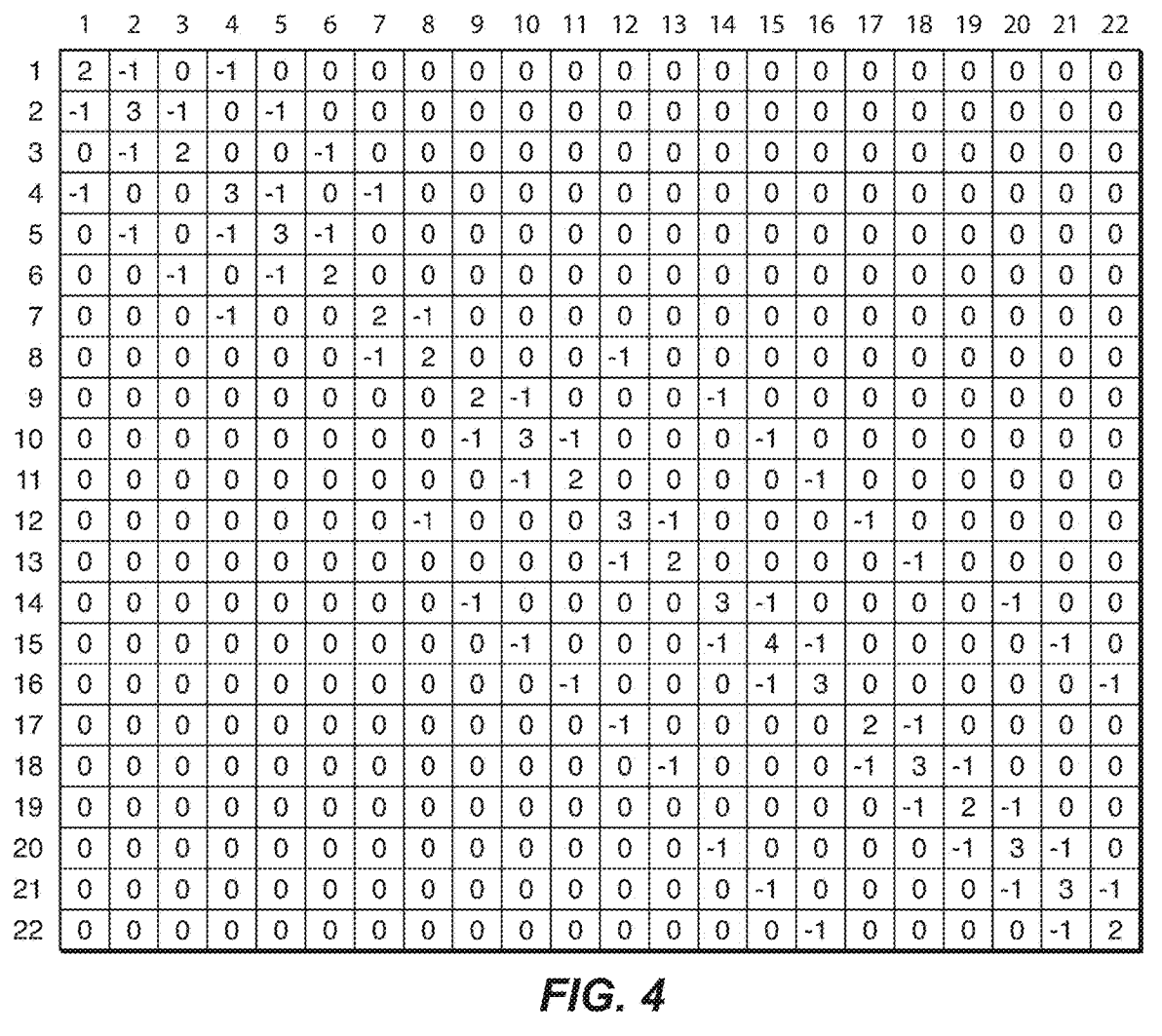

Step 32 is the formation of a connectivity or similarity matrix that describes which voxels are connected. In some embodiments of the inventive method, the connectivity matrix will also specify how well voxels are connected or how similar connected voxels are, in which case similarity between voxels serves as a measure of connectivity between said voxels. In a preferred embodiment of the inventive method, however, connectivity is discrete: two voxels are either connected or not connected. FIG. 4 presents a preferred connectivity matrix C for this binary case for the examples of FIG. 1 and FIG. 2. To aid the correlation of the matrix with the bodies, the voxel numbers are explicitly given in the first row and first column. For the off-diagonal elements of this matrix such as $C_{ij}$ ($i \neq j$), an entry of −1 indicates that voxels i and j are connected while an entry of 0 indicates that voxels i and j are disconnected. For diagonal elements of this matrix such as $C_{ij}$ ($i=j$), a non-zero entry indicates that voxel i is connected to some voxels, where the actual entry indicates the number of connections for this voxel, i.e., an entry of 2 indicates two connections. A zero-valued entry on the diagonal would indicate that this voxel is disconnected from the geobody that is to be decomposed. Note that every row and every column sums to zero. In the mathematical field of graph theory, this matrix C is called the Laplacian matrix, sometimes also called admittance matrix or Kirchhoff matrix.

The use of the Laplacian matrix is suggested by the expectation that neighboring (connected) voxels are likely to belong to the same component. Thus if one would compute a 'gradient' or difference between connected voxels, then one would expect this 'gradient' or difference to be small or negligent for most pairs of connected voxels because they belong to the same component. There will be some differences unless all voxels belong to the same component, and one may wish to minimize these differences. Minimizing differences implies the use of some metric, and so one may want to minimize these differences in the least-squares sense which leads directly to the Laplacian matrix.

The Laplacian matrix is a preferred embodiment of the connectivity matrix, but the connectivity matrix can also be defined otherwise. In a variation of the Laplacian-type connectivity matrix, the off-diagonal elements $C_{ij}$ ($i \neq j$) are set to +1, indicating that voxels and j are connected while an entry of 0 indicates that voxels i and j are disconnected. For diagonal elements of this matrix such as $C_{ij}$ ($i=j$), a non-zero entry indicates that voxel i is connected to some voxels, where the actual entry indicates the number of connections for this voxel, i.e., an entry of 2 indicates two connections. Note that for this variation, neither rows nor columns sum to zero. This variation of the Laplacian matrix is an example of a similarity matrix $C_{ij}$ that records the similarity of two items i and j, where similarity is measured based on some specified similarity measure or metric. Many metrics will assign high similarity values when items are compared to themselves (i.e., self-similarity) and lower similarity values when items are compared against others (i.e., cross-similarity). The result is a similarity matrix that is predominantly diagonally dominant.

In some embodiments of the inventive method, the connectivity or similarity matrix is further modified by (nonlinear) scaling of the matrix entries. A preferred method for scaling is exponential scaling $C'=e^{\alpha C}$, where α is a specified, real coefficient. For α>1, exponential scaling tends to increase the dominance of the diagonal matrix entries.

Preferably, the connectivity matrix or similarity matrix is real-valued and symmetric, and thus, the specified connectivity or similarity measure (metric) is real-valued and symmetric, too.

In yet another embodiment, the entries in the matrix C are computed by applying a function on the distance between pairs of elements. Specifically, Cij=f(dist(eli, elj)), where dist(eli, elj) is problem dependent. For example, the distance function dist( ) may be the Euclidean distance of the elements residing in an n-dimensional real space; the function f( ) may be the exponential function, so $C_{ij}=\exp(-\|el_i-el_j\|_2)$. Normalization of this matrix may also be performed (such as shown by Coifman et al., PNAS 102, 7426-7431 (May 24, 2005)).

Step 33 is the computation of a new set of basis vectors for the geobody from the eigenvector decomposition of its connectivity matrix. The number of vanishing eigenvalues will correspond to the number of connected geobodies that form the initial geobody. If the initial geobody was isolated correctly, then there should be just one vanishing eigenvalue. Some embodiments of the inventive method may skip the separation into disconnected geobodies and may need to perform this separation at this step using the number of vanishing eigenvalues to determine the number of disconnected geobodies and using the pattern of vanishing entries in the eigenvectors to separate the disconnected bodies. FIG. 5 shows the first three eigenvalues when ordered from smallest to largest, and the corresponding eigenvectors for the connectivity matrix of FIG. 4 and the example geobody of FIG. 1.

When using a Laplacian-type connectivity matrix, the eigenvalues can be interpreted as a kind of frequency. The smaller the eigenvalue, the lower the "frequency" and thus the longer the "wavelength" of the components described by the second set of basis functions, i.e., the eigenvectors. The first eigenvector has constant entries, indicating that one geobody that can be formed from the initial voxels is the initial geobody. The other eigenvectors have variable entries of differing polarities, indicating "geobodies" that can be formed by fractional membership of the initial voxels.

The actual values of the entries of the eigenvectors relate to connectivity and path lengths. Directly connected voxels will have small gradients and thus similar values. Two voxels with many short paths leading from one to the other (i.e., highly connected voxels) will have more similar values than voxels that are connected only by a few long paths.

For other kinds of connectivity matrices, such as exponentially scaled similarity matrices, the relationship between eigenvalue and "frequency" may reverse and the eigenvalue could be interpreted as a kind of periodicity. The larger the eigenvalue, the longer the "period" and thus the longer the "wavelength" of the components described by the second set of basis functions, i.e., the eigenvectors.

Returning to the example of FIGS. 4 and 5 based on a Laplacian-kind connectivity matrix, a peculiar result is revealed when plotting the second eigenvector against the third eigenvector. The first entry of the second eigenvector is cross plotted against the first entry of the third eigenvector and the point is labeled '1'. The second entry of the second eigenvector is cross plotted against the second entry of the third eigenvector and the point is labeled '2', and so on.

The justification for this labeling process is that each eigenvector describes a geobody where each voxel has a partial membership. Projecting the eigenvectors (i.e., the second set of basis functions) onto the first set of basis functions reveals this partial membership. Since the first set of basis functions is simply (1, 0, 0 . . . ), (0, 1, 0 . . . ), (0, 0, 1 . . . ), . . . , the projections do not need to be computed explicitly. Instead, the first entry in each eigenvector relates to the first voxel, the second entry in each eigenvector relates to the second voxel, etc.

Figure 6:
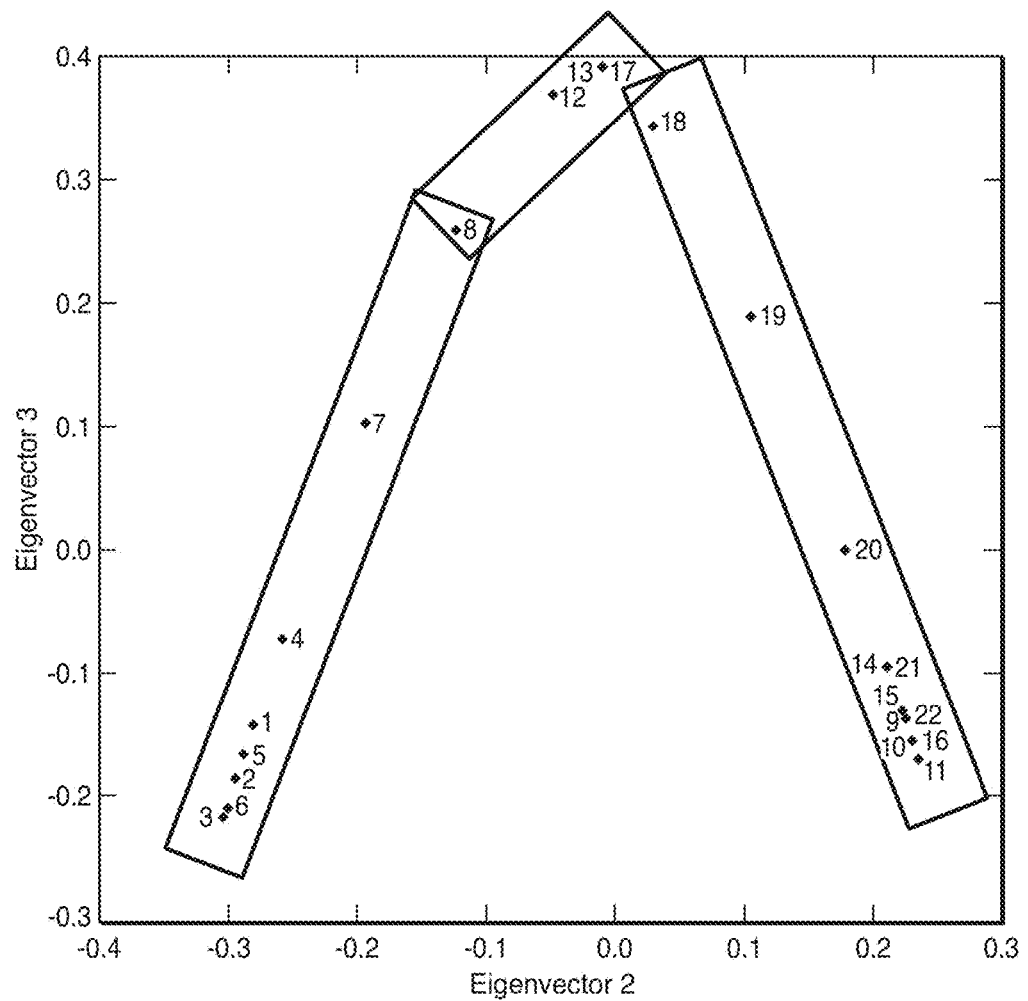
FIG. 6 is a cross-plot of eigenvectors 2 and 3 with the individual points labeled by index or voxel label in the order that they are listed in FIG. 5, and showing points of the cross-plot falling into lineal sub-spaces in eigenvector space.

The result of this cross-plotting and labeling is presented in FIG. 6. Labels 1, 2, 3, 4, 5, 6, 7, and 8 lie on a linear trend, or in other words, they form a lineal cluster. Labels 1 to 3 and 5 to 6 are close together, while label 4 is a little bit separated. Label 7 is more separated, and label 8 is even further separated. Labels 13, 17, and one of 12 or 18 form a lineal cluster. Labels 9 to 11, 14 to 16, and 18 to 22 form a lineal cluster. Label 20 is a little bit separated from the center of the lineal cluster, label 19 a more separated, and label 18 is far separated.

Figures 7, 8:
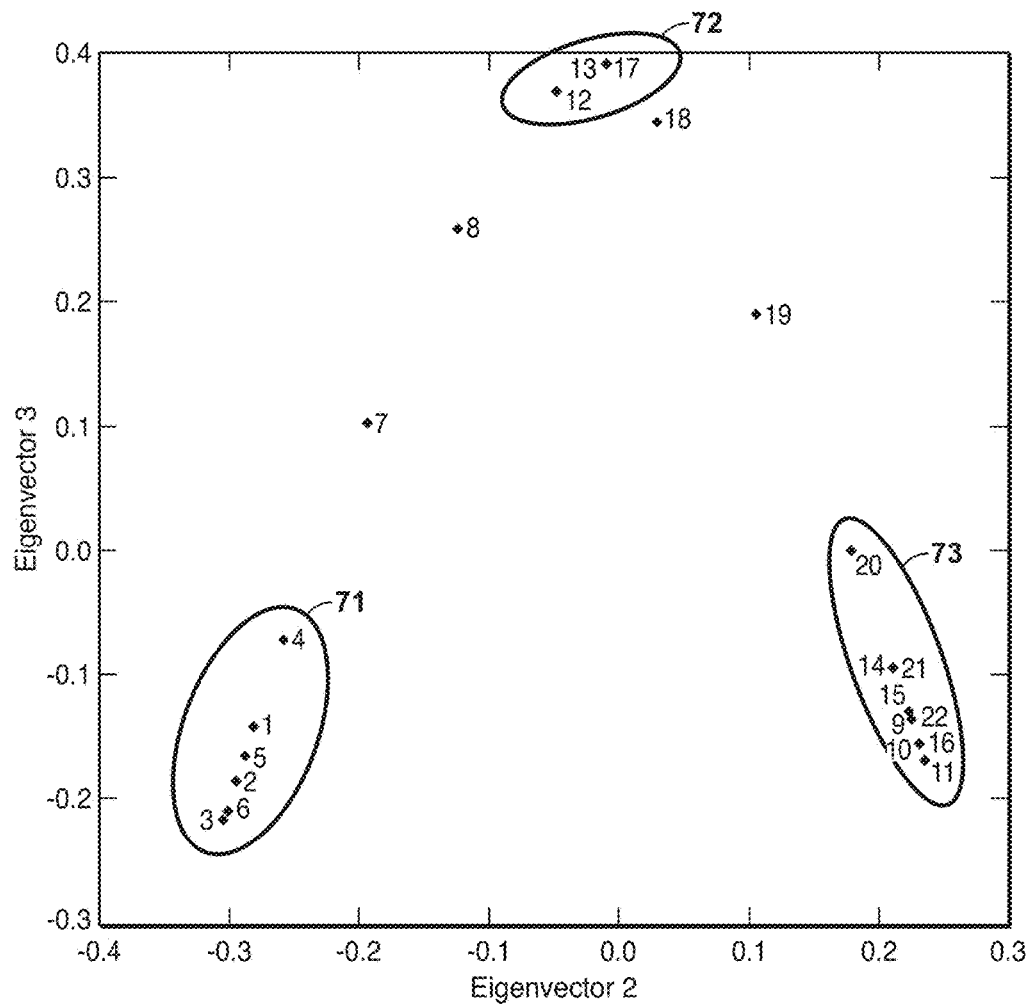
FIG. 7 shows a likely clustering of the points in the cross-plot of FIG. 6, corresponding to three components of the geobody of FIG. 1.
FIG. 8 shows the three components of the geobody identified in FIG. 7.

Each lineal cluster may be regarded as defining a component of the initial geobody. FIG. 7 presents three components 71, 72, and 73 of the initial geobody, as defined by the lineal clusters. Component 71 is formed by voxels 1, 2, 3, 4, 5 and 6. Component 72 is formed by voxels 12, 13, and 17. Note that component 72 could also be formed by voxels 13, 17, and 18 as they also lie on a linear trend and thus form a lineal cluster. Voxels 12 and 18 are very similar to each other in a connectivity sense and a lineal cluster can be formed with either of them, but not both of them. While this behavior may appear to be a severe limitation, it is mainly a pathologic case caused by the small two-dimensional example. In practice, especially when decomposing three-dimensional geobodies, it often does not matter to which components bridging or linking voxels are assigned. Component 73 is formed by voxels 9, 10, 11, 14, 15, 16, 20, 21, and 22. Whether voxels 4 and 20 should be assigned to a component, and whether 7, 8, 18, and 19 should remain unassigned appears relevant for this example. In practice with large three-dimensional geobodies, where the boundaries are drawn exactly will matter much less.

Figure 9:
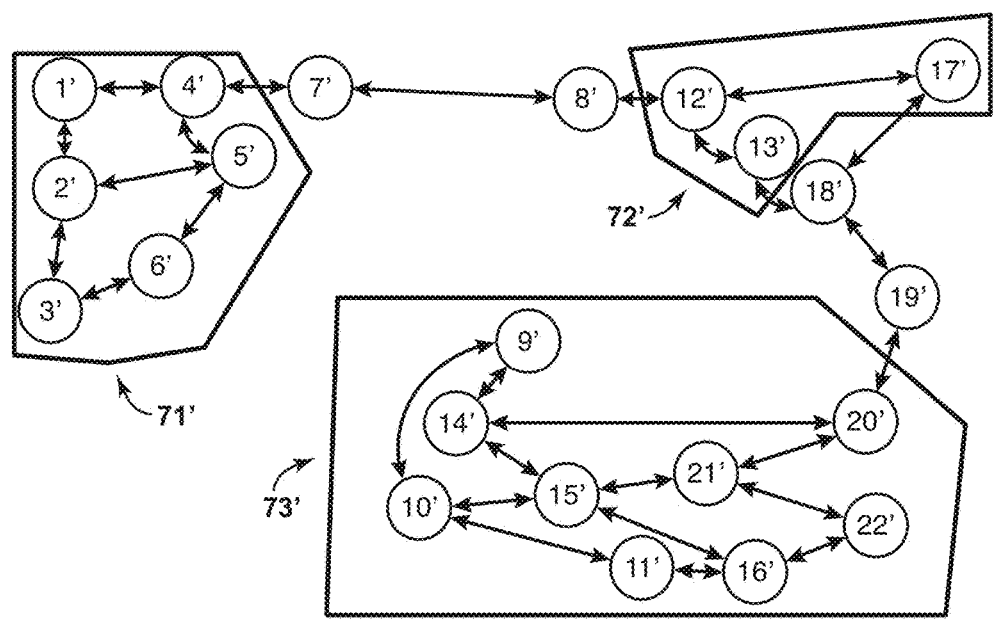
FIG. 9 shows three components from FIG. 8 in an isomorphic decomposition.

The observation of the lineal trends in FIGS. 6 and 7 is the basis of the inventive step 34, the association of lineal subspaces with components and the association of clusters within a lineal subspace to smaller components of a larger component. FIGS. 8 and 9 show the resulting decompositions when the voxels or elements of FIGS. 1 and 2 are assigned to components 71', 72' and 73' (or 71", 72", and 73") based on the identified lineal subspaces 71, 72, and 73.

In one preferred embodiment of the invention, in step 34, an interpreter selects the lineal subspaces. First, the interpreter selects a set of eigenvectors from the eigenvectors computed in step 33 and forms at least one subset that is cross plotted (step 341). Using at least one such cross plot, the interpreter may define a subspace (step 342), for example by designating two samples as extremes of a bounding box. All samples within this bounding box are assigned to one component. Alternatively, the interpreter may select two samples and specify a distance. All samples within the specified distance from the line segment formed by the two selected points are assigned to one component.

Regarding which eigenvectors may be most advantageous to select for cross plotting, the magnitude of the eigenvalues will provide some guidance. The eigenvectors for the smallest eigenvalues will reveal the large components, while the eigenvectors for intermediate eigenvalues will reveal subcomponents. The eigenvectors for the large eigenvalues will be mostly useless, generating highly-oscillatory, checkered components. Experience has indicated that a selection of 3 to 9 of the first 20 eigenvectors (corresponding to the smallest 20 eigenvalues (excluding zero)) may be a reasonable choice when performing steps 33-341, i.e., manual cross-plotting, whereas it may be reasonable to use the first 10 to 15 eigenvectors when performing the method of FIG. 3 via the 33-343 embodiment. However, this will depend on circumstances, and the invention is not limited to this range of eigenvectors.

In another preferred embodiment, step 34 may be performed using a computer algorithm in step 343 that detects lineal subspaces within a specified set of eigenvectors computed in step 33, and in step 344 assigns samples that fall into one subspace to one component. One example of such lineal subspace clustering algorithms is the RANSAC algorithm (Fischler and Bolles, "Random Sample Consensus: A Paradigm for Model Fitting with Applications to Image Analysis and Automated Cartography," Comm. of the ACM 24 (6): 381-395 (1981); doi:10.1145/358669.358692). Alternatively, the subspace clustering algorithm may require the interpreter to specify the desired number of subspaces and thus the desired number of components. Lineal subspace clustering is a special case of K-subspace clustering (Yang, et al., "Clustering appearances of objects under varying illumination conditions", Proceedings of the IEEE Computer Society Conference on Computer Vision and Pattern Recognition (CVPR 2003), vol. 1, 11-18, (2003); http://ieeexplore.ieee.org/stamp/stamp.jsp?tp=&arnumber=1211332; and Wang et al., "K-Subspace Clustering," Proceedings of the European Conference on Machine Learning and Principles and Practice of Knowledge Discovery in Databases (ECML/PKDD 2009), 506-521 (2009); http://users.cis.fiu.edu/~taoli/pub/k-subspace-clustering.pdf).

In another alternative for step 344, clusters within one lineal subspace are also separated, for example by secondary clustering of samples within one lineal subspace. An exemplary secondary clustering algorithm could be the Expectation-Maximization (EM) algorithm of Dempster, et al. ("Maximum Likelihood from Incomplete Data via the EM Algorithm," Journal of the Royal Statistical Society, 39, 1-38 (1977); http://web.mit.edu/2.435/www/Dempster77.pdf) which finds a Gaussian mixture model fitting the data. In one preferred embodiment, the interpreter provides input seeds as the initial centers for the Gaussian mixture and thus the components within a component.

By way of summary of steps 343 and 344, the present inventive method may be considered to be comprised of two parts: transformation of a geobody to a vector space based on connectivity, and identification of lineal subspaces in this vector space. Lineal subspaces may be detected using known algorithms.

Using the "random sample consensus" algorithm RANSAC as an example, it is an iterative method to estimate parameters of a mathematical model from a set of observed data that contains outliers. It is a non-deterministic algorithm in the sense that it produces a reasonable result only with a certain probability, with this probability increasing as more iterations are allowed. A basic assumption is that the data also include "inliers", i.e., data whose distribution can be explained by some set of model parameters, though may be subject to noise, and the aforementioned "outliers," which are data that do not fit the model. The outliers can come, e.g., from extreme values of the noise or from erroneous measurements or incorrect hypotheses about the interpretation of data. RANSAC also assumes that, given a (usually small) set of inliers, there exists a procedure that can estimate the parameters of a model that optimally explains or fits this data.

A simple example is fitting of a line in two dimensions to a set of observations. Assuming that this set contains both inliers, i.e., points that approximately can be fitted to a line, and outliers, points that cannot be fitted to this line, a simple least-squares method for line fitting will in general produce a line with a bad fit to the inliers. The reason is that it is optimally fitted to all points, including the outliers. RANSAC, on the other hand, can produce a model that is computed only from the inliers, provided that the probability of choosing only inliers in the selection of data is sufficiently high. There is no guarantee for this situation, however, and there are a number of algorithm parameters that must be carefully chosen to keep the level of probability reasonably high.

Optionally, the geobody and its components are visualized (step 35), at least for the purpose of quality control. Preferably, the association of lineal subspaces with components (step 34) is performed simultaneously with visualization of the resulting components (step 35), especially when doing it interactively (step 342).

Optionally, the resulting components are analyzed in step 36 for consistency and connectedness. Preferably, individual components identified in step 34 are analyzed for connectivity, especially when using a clustering algorithm in step 344 as opposed to interactive picking in step 342. Disconnected parts of any component that is found to be non-contiguous may be assigned to additional components. The tasks of analysis and reassignment can be combined using, for example, a connected component labeling algorithm.

At step 37, the resulting components may be outputted for further analysis. Some embodiments of the present inventive method also output the connectivity structure between individual components and/or for the voxels of some specified components.

EXAMPLE

Figure 10:
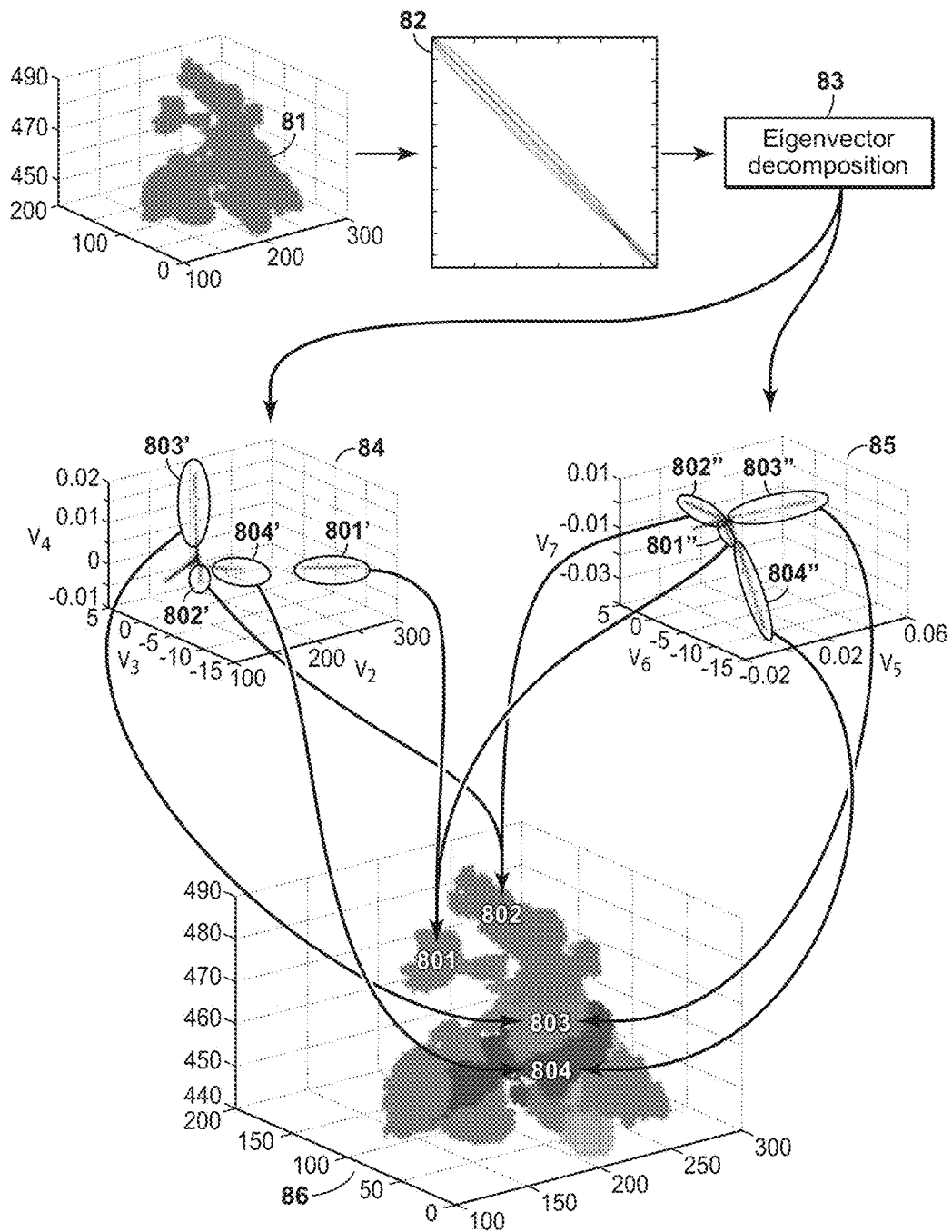
FIG. 10 is a schematic diagram illustrating application of the present inventive method to a test example.

FIG. 10 presents an example application of the present inventive method. 81 is an initial geobody in x-y-z space that was formed by thresholding a seismic attribute. The voxels where the attribute was below the threshold are rendered transparent, while the voxels where the attribute exceeds the threshold are rendered in gray. Each axis scale refers to the voxel location in the original seismic attribute cube. The geobody 81 consists of roughly 10,000 samples and has a complex shape. It is fairly clear that this geobody is formed from smaller components. In accordance with the present inventive method, the voxels are enumerated and each voxel is examined for connectivity using the criterion of six connectivity, i.e., face connectivity, which allows formation of the connectivity matrix 82.

The eigenvector decomposition 83 of this connectivity matrix yields a set of more than 10,000 pairs of eigenvalues and eigenvectors. Because the geobody 81 is fully connected, only the first and smallest eigenvalue $v_1$ vanishes. Choosing an interactive embodiment of the inventive method, the interpreter selects two sets of eigenvectors ($v_2$, $v_3$, $v_4$) and ($v_5$, $v_6$, $v_7$), and proceeds to plot $v_2$ against $v_3$ and against $v_4$ resulting in cross plot 84. (Because all components of $v_1$ are the same, cross plotting against $v_1$ will not separate the points.) The interpreter also plots $v_5$ against $v_6$ and against $v_7$ resulting in cross plot 85. Both cross plots appear to be tentacle-like. Each tentacle is a lineal subspace. Some tentacles exhibit some internal grouping or clustering. The interpreter proceeds to pick bounding boxes around tentacles or groups within tentacles in an interactive manner. The result of this effort is indicated by the shading of the points of cross-plots 84 and 85. Each shade (or color in actual practice) indicates a different tentacle or a different group within a tentacle. Each bounding box, and thus each shade, is associated with a component. The voxels of the geobody 81 are associated with these components and are rendered with the corresponding shape or color to present the components 86 in x,y,z space. The group 801' is part of a larger lineal subspace, but clearly separated from the other samples contained in this subspace. The group 801' is associated with a component. Highlighting the voxels of group 801' on cross plot 84 reveals the contiguous component 801' that clearly is an identifiable and reasonable building block or component of the overall geobody. The continuous component 801 is also identified on cross plot 85 by the tentacle 801". 801 could be picked on either cross plot, but cross plot 84 appears to isolate 801 better, also revealing the presence of internal clusters within 801'. The group 802 appears to be a lineal subspace without internal clusters. Highlighting the voxels of 802' or 802" reveals the component 802. The groups 803' and 804' both form lineal subspaces, but within each subspace there appears to be some internal grouping or clustering. Similar groups 803" and 804" can be identified on cross plot 85 that also reveals internal grouping or clustering. Highlighting the corresponding voxels within the geobody reveals components 803 and 804. Both 803 and 804 appear to have some internal structures or subcomponents that could be picked by selecting groups or clusters within their subspaces.

In other embodiments of the inventive method, connectivity is not discrete. Instead, the connectivity matrix expresses how well two neighboring voxels are connected or how similar two neighboring voxels are to each other. In the first case, a connection is weighted; while in the second case, each voxel is associated with a label or index i and an attribute or property value vi. The two cases are not mutually exclusive: one definition of connection weight is the magnitude of their attribute difference. Another preferred definition of connection weight is their attribute average. With this definition of connection weight, an off-diagonal element of the connectivity matrix Cij for two connected voxels i and j (where i ≠j) is set to −½(vi+vj). A diagonal element Cii of the connectivity matrix is set to $\Sigma \frac{1}{2}\epsilon_{ij}(vi+vj)$ where $\epsilon ij$ is one when voxels i and j are connected and zero when voxels i and j are disconnected from each other.

In some preferred embodiments of the inventive method, the diagonal elements of the connectivity matrix are set to zero, effectively removing a self interaction or self connectivity.

In some embodiments of the inventive method, specified eigenvectors of the connectivity matrix are used to compute a connectivity measure for the voxels. The first component of the specified eigenvectors defines the location of the first voxel in a vector space. The second component of the specified eigenvectors defines the location of the second voxel in said vector space, and so on for the remaining components and voxels. For a specified voxel in said vector space, the shortest distance to any other voxel in said space defines a measure of connectivity indicating how connected the specified voxel is to all others. Iterating this process over essentially all voxels allows computation of a connectivity measure for essentially every voxel, resulting in a connectivity attribute. For computational efficiency, it may be advantageous to limit for a specified voxel the search of its nearest voxel in said vector space. Instead of computing the distance to every other voxel in said vector space, it is preferable to compute only the distance in said vector space to its original neighbors as indicated by the connectivity matrix. Using voxel 5 of FIG. 1 as an example, preferably only the distances to voxels 2, 4, 6, and 7 are computed in said vector space to determine a shortest distance and thus a measure of connectivity for voxel 5.

Details of the distance function are irrelevant. Different distance functions result in different connectivity measures. Any metric or any generalized metric associated with said vector space results in a connectivity measure.

Instead of explicitly computing all or a few specified eigenvectors from the connectivity matrix and using these eigenvectors to compute a distance between voxels, distances may be computed directly from the connectivity matrix using either an iterative or algebraic process. In the iterative process, the connectivity measure ci is computed iteratively $$\text{as } c \Leftarrow dMc + \frac{(1-d)}{N}1$$

until a specified (convergence) criteria is satisfied where d is a small damping coefficient, $M_{ij}=1/C_{ij}$ if $C_{ij}\neq 0$ and zero otherwise, N refers to the number of voxels, and 1 is a vector of dimension N containing only ones. An initial value for c may be 1/N. In the algebraic process, $$c = (I - dM)^{-1}\frac{(1-d)}{N}1,$$

where I is an identity matrix. For computational efficiency, the iterative process is preferably used. U.S. Pat. No. 6,285,999 to Page discloses a method for ranking linked web pages based on similar mathematical notions.

Depending on the specifics of the connectivity matrix, in some embodiments of the inventive method the connectivity matrix is normalized prior to the direct estimation of connectivity measures, for example by scaling each row sum, each columns sum, or each row sum and each column sum of the connectivity matrix C to one.

In graph theory and network analysis, centrality of a vertex measures its relative importance within a graph. Examples include how influential a person is within a social network, how well-used a road is within an urban network, or how well connected the voxels are within their geobodies or connectivity structures. There are four main measures of centrality: degree, betweenness, closeness, and eigenvector. The connectivity measures disclosed with this invention are examples of eigenvector-based centrality measures.

Degree centrality refers to the number of connections for a specified node, potentially weighted by the attribute value. For the disclosed connectivity matrices, degree centralities or degree-based connectivity measure may be computed by row sums, column sums, or row-column sums, preferably excluding elements on the matrix diagonals from the sum.

In a connected graph such as shown in FIG. 2, there is a distance metric between any two voxels belonging to this graph that is defined by the length of the shortest path between the two specified voxels. The length of a path is defined by the number of connections linking the two specified voxels, or in the attributed case, by the sum of the attributes along a path linking the specified voxels. The farness of any voxel is defined by the sum of its distances to all other voxels of the graph. Closeness centrality is defined as the inverse of farness. The more central a voxel is, the lower its total distances to all other voxels. Closeness centrality can be viewed as a measure of how long it will take to spread information sequentially from a voxel to all other voxels belonging to the same graph.

For a geobody attributed with hydraulic permeability, the voxel with the largest closeness centrality or the largest closeness-based connectivity measure is the voxel that would allow fastest drainage of the geobody of its fluids.

Extensions of closeness centrality account not only for the shortest path length but also for the number of paths.

Betweenness centrality quantifies the number of times a voxel acts as a bridge along the shortest path between any two voxels of a geobody. It may be advantageous to scrutinize voxels with high betweenness centrality because a small perturbation to the connectivity structure or the attributes might dramatically alter the shortest paths and their spatial distributions.

Eigenvector centrality is a measure of the influence of a voxel in the connected graph of the geobody. Eigenvector centrality assigns a relative score to all voxels based on the principle that connections from a specified voxel to high-scoring voxels contribute more to the score of the specified voxel than connections to low-scoring voxels. The centrality score or eigenvector-based connectivity measure c can be defined as solution to the eigenvector equation C c=$\lambda$c. There will typically be multiple eigenvalues $\lambda$ for which an eigenvector solution exists. The dominant eigenvector associated with the largest eigenvalue is preferably obtained by an iterative process.

In some embodiments of the inventive method, a centralization measure is computed for a geobody whose voxels have been attributed with a specified connectivity measure. Centralization for the specified geobody measures how central its most central voxel is in relation to all of its other voxels, for example by computation of $\Sigma c_{max}-c_i$. Preferably, this quantity is normalized by the number of voxels or the theoretically largest sum of centrality differences for a graph of similar size. It may be advantageous to estimate the theoretically largest sum of centrality differences for a graph of similar size by constructing a compact geobody with the same number of voxels and maximal connectivity, for example in the shape of a ball. In the attributed case, every voxel or connection of this ideal geobody is attributed with a maximal value in accordance to the specified attribute.

In some embodiments of the inventive method, multiple geobodies are ranked in order of their centralization measures. In some embodiments of the inventive method, the multiple geobodies are obtained by decomposition of a complex initial geobody into simpler ones. Preferably, this decomposition is performed with the novel geobody decomposition method disclosed in this publication.

In some embodiment of the inventive method, the geobody is formed from cells in a reservoir model, and voxel or cell attributes relate to at least one property of the reservoir model such as porosity, permeability, or transmissibility. The initial geobody is created by thresholding, by definition of a spatial bounding box, or by any other method. It may be advantageous to decompose the initial geobody into a set of simpler ones using the novel methods disclosed herein. In a preferred embodiment of the inventive method, the reservoir model is populated with properties by conditioning on seismic data.

In some preferred embodiments of the inventive method, a connectivity measure is assigned to geobodies formed from the reservoir model. The connectivity measure serves as a proxy to a reservoir simulation or reservoir performance analysis. Proxy simulations for performance prediction are well known to practitioners of the art. Examples of such proxy simulations may be European Patent No. 1,994,488 to Li et al entitled "Method for Quantifying Reservoir Connectivity Using Fluid Travel Times", U.S. Pat. No. 8,437,997 to Meurer et al entitled 'Dynamic Connectivity Analysis', U.S. Pat. No. 7,164,990 to Bratvedt et al entitled "Method Of Determining Fluid Flow", or Hirsch and Schuette, "Graph Theory Applications To Continuity And Ranking In Geologic Models", Computers & Geosciences, 25(2), 127-139, 1999. All these proxies, however, are source-target proxies where some voxels or cells are designated to be sources or injectors and other voxels are designated as targets, sinks, or producers. Sources, targets and conductors (i.e., voxels that are neither sources nor sinks) are mutually exclusive. The purpose of these proxies is the analysis of different reservoir development or production scenarios to examine the connectivity between the oil-bearing reservoir and the producer wells or the connectivity between water-injection wells and hydrocarbon-production wells. The novel connectivity measures disclosed in this publication are independent of sources and targets. No well locations need to be specified. Voxels do not need to be separated into mutually exclusive sources, sinks, and conductors. Instead, each voxel is compared to all others. Each voxel acts simultaneously as source, sink, and conductor. The disclosed connectivity measures allow examination of the model for highly connected regions, for disconnected compartments, for barriers, and regions where small even perturbations of connectivity and attributes (porosity, permeability, or transmissibility) will change long-distance connectivity by disconnecting one region or compartment into multiple ones or connecting multiple regions or compartments into one, thus warranting additional scrutiny to analyze these sensitive regions.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented.

The invention claimed is:

1. A method for decomposing a geobody, comprising:
   selecting an initial set of voxels that represent the geobody, wherein the initial set of voxels is from a 2-D or 3-D set of seismic data;
   defining a measure of connection, and constructing a connectivity matrix showing which voxels are connected by direct voxel-to-voxel contact according to the measure or a similarity matrix showing which voxels are similar and connected by direct voxel-to-voxel contact according to the measure;
   computing eigenvectors of the similarity or connectivity matrix, using a computer;
   discarding a plurality of eigenvectors corresponding to largest eigenvalues, then using a plurality of the remaining eigenvectors to form an eigenvector space;
   associating lineal sub-spaces in the eigenvector space with groupings of the voxels in the initial set of voxels, wherein the groupings of the voxels represent components of the geobody;
   generating, with a computer, a subsurface image that includes the geobody and indicates the components of the geobody corresponding to the groupings of the voxels; and
   prospecting for hydrocarbons based on subsurface connectivity derived from the connected components of the geobody.

2. The method of claim 1, further comprising using clustering within the lineal sub-spaces to define groupings of the voxels in the initial set of voxels.

3. The method of claim 1, further comprising displaying the components for visualization by a human interpreter.

4. The method of claim 3, wherein the components are visualized concurrently with the associating lineal sub-spaces with groupings.

5. The method of claim 1, wherein the eigenvector space is a cross-plot of at least two selected eigenvectors and the defining groupings is performed by a human interpreter.

6. The method of claim 5, wherein the at least two selected eigenvectors are selected based on their corresponding eigenvalues.

7. The method of claim 1, wherein each of one or more selected groupings is analyzed for similarity or connectivity of the voxels within it.

8. The method of claim 7, wherein the similarity or connectivity analysis is used to separate sets of dissimilar or disconnected voxels into additional groupings.

9. The method of claim 1, further comprising:
   computing a centralization measure from the similarity or connectivity matrix; and
   using the centralization measure for hydrocarbon exploration or production.

10. The method of claim 9, wherein the centrality measure is one of degree, betweenness, closeness, and eigenvector.

11. The method of claim 9, further comprising using the centralization measure to decompose the geobody into the components.

12. The method of claim 9, further comprising ranking the components in order of their centralization measures.

* * * * *